(12) United States Patent
Nelson et al.

(10) Patent No.: US 6,600,249 B2
(45) Date of Patent: Jul. 29, 2003

(54) BRUSHLESS DC RING MOTOR COOLING SYSTEM

(75) Inventors: Christopher A. Nelson, Bloomington, MN (US); Bradford K. Palmer, Minneapolis, MN (US)

(73) Assignee: Horton, Inc., Minneapolis, MN (US)

(*) Notice: Subject to any disclaimer, the term of this patent is extended or adjusted under 35 U.S.C. 154(b) by 0 days.

(21) Appl. No.: 09/848,544

(22) Filed: May 3, 2001

(65) Prior Publication Data

US 2002/0003381 A1 Jan. 10, 2002

Related U.S. Application Data

(60) Provisional application No. 60/201,466, filed on May 3, 2000, and provisional application No. 60/220,942, filed on Jul. 26, 2000.

(51) Int. Cl.[7] .......................... H02K 5/00; F04B 35/04; F01P 7/02; K02K 37/00
(52) U.S. Cl. .......................... 310/91; 310/58; 417/356; 417/423 R; 123/41.12; 123/41.49
(58) Field of Search .............................. 310/67 R, 267, 310/269, 58; 417/368, 423.8, 354, 369; 165/121, 140, 41; 180/68.1, 65.2, 65.3; 123/41.11, 41.12, 41.49, 41.33; 318/471, 439, 138, 254, 432, 798

(56) References Cited

U.S. PATENT DOCUMENTS

| | | | |
|---|---|---|---|
| 3,621,822 A | 11/1971 | Oster .................. 123/41.12 |
| 3,663,850 A | 5/1972 | Phelon ................ 310/153 |
| 3,823,363 A | 7/1974 | Hill ..................... 322/33 |
| 4,210,833 A * | 7/1980 | Neveux | |
| 4,313,155 A | 1/1982 | Bock et al. ........... 363/21 |
| 4,313,402 A | 2/1982 | Lehnhoff et al. ..... 123/41.12 |
| 4,378,760 A | 4/1983 | Barge ................... 123/41.12 |
| 4,426,960 A | 1/1984 | Hart ..................... 123/41.49 |
| 4,459,087 A | 7/1984 | Barge ................... 417/356 |
| 4,548,548 A | 10/1985 | Gray, III .............. 416/189 |
| 4,554,491 A * | 11/1985 | Plunkett | |
| 4,651,922 A | 3/1987 | Noba .................... 236/35 |
| 4,685,513 A | 8/1987 | Longhouse et al. .... 165/121 |
| 4,811,185 A | 3/1989 | Cook et al. ........... 365/17 |
| 4,875,521 A | 10/1989 | Clemente ............. 165/39 |
| 4,882,511 A * | 11/1989 | Heide | |
| 4,955,431 A | 9/1990 | Saur et al. ............ 165/1 |
| 4,962,734 A | 10/1990 | Jorgensen ............. 123/41.49 |
| 5,164,622 A * | 11/1992 | Kordik | |
| 5,224,446 A | 7/1993 | Okita et al. .......... 123/41.12 |
| 5,363,003 A | 11/1994 | Harada et al. ........ 310/67 R |
| 5,460,485 A | 10/1995 | Sugiyama et al. ..... 415/208.2 |
| 5,476,138 A | 12/1995 | Iwasaki et al. ....... 165/41 |
| 5,495,909 A | 3/1996 | Charles ................ 180/68.1 |
| 5,522,457 A | 6/1996 | Lenz ................... 165/121 |
| 5,597,038 A | 1/1997 | Potier .................. 165/121 |
| 5,623,893 A | 4/1997 | Bartz et al. .......... 123/41.49 |
| 5,675,196 A * | 10/1997 | Huang et al. | |
| 5,804,904 A * | 9/1998 | Park et al. | |
| 5,929,544 A * | 7/1999 | Maekawa et al. | |
| 5,962,938 A * | 10/1999 | Bobay et al. | |
| 6,016,774 A | 1/2000 | Bokkers et al. ...... 123/41.1 |
| 6,045,482 A | 4/2000 | Nishar et al. ........ 477/107 |
| 6,249,099 B1 * | 6/2001 | Nessi et al. | |
| 6,253,716 B1 | 7/2001 | Palmer et al. ........ 123/41.12 |
| 6,276,472 B1 * | 8/2001 | Takashima et al. | |
| 6,329,736 B1 | 12/2001 | Bernauer et al. | |

FOREIGN PATENT DOCUMENTS

WO PCT/US01/14188 5/2001

* cited by examiner

*Primary Examiner*—Tran Nguyen
(74) *Attorney, Agent, or Firm*—Kinney & Lange, P.A.

(57) ABSTRACT

A cooling system for a vehicle includes a shroud attachable to a fixed portion of the vehicle. A stator assembly for a brushless DC ring motor is attached to at least one mounting support of the shroud. A cooling fan is piloted on the stator assembly, and includes a ring supporting a plurality of fan blades for sweeping an area inside the shroud. A rotor assembly for the brushless DC ring motor is attached to the ring of the cooling fan. The rotor assembly confronts the stator assembly around an outer diameter of the stator assembly. The cooling system is controlled by an electronic controller to rotate the cooling fan to provide appropriate cooling for the vehicle.

15 Claims, 11 Drawing Sheets

BRUSHLESS DC RING MOTOR COOLING SYSTEM

CROSS-REFERENCE TO RELATED APPLICATION(S)

This application claims the benefit of Provisional Application Ser. No. 60/201,466 filed May 3, 2000 for "Brushless DC Ring Motor Cooling System" by C. Nelson and B. Palmer, and also claims the benefit of Provisional Application Ser. No. 60/220,942 filed Jul. 26, 2000 for "Brushless DC Ring Motor Cooling System" by C. Nelson and B. Palmer.

INCORPORATION BY REFERENCE

The aforementioned Provisional Application Ser. No. 60/201,466 and Provisional Application Ser. No. 60/220,942 are hereby incorporated by reference in their entirety.

BACKGROUND OF THE INVENTION

The present invention relates to an electric cooling fan, and more particularly to a brushless DC ring motor cooling system for use in diesel power applications such as over-the-road trucks.

Diesel power applications such as over-the-road trucks, off-road equipment and agricultural equipment require a cooling system to serve a variety of cooling needs in the equipment. These systems typically contain a number of heat exchangers, a cooling fan, and in some cases a fan drive. In cases where a fan drive is not used, the fan is driven by a belt and continually rotates at a fixed ratio to engine speed. At least three sub-systems are served by the cooling fan, including the engine cooling system, the charge air system and air conditioning system. Other systems such as a transmission cooling system and hydraulic cooling system could also be served by the cooling fan.

Typical fan drives may be implemented as on/off clutches, viscous clutches or hydraulic systems, for example. On/off clutches are usually mounted to the front of the engine block, and the clutch is belt driven by the crankshaft pulley. In some cases, the on/off clutch is mounted on the water pump, which also turns at a speed related to engine revolutions-per-minute (RPM). On/off clutches may be pneumatic, hydraulic, electric or spring engaging.

Viscous clutches are driven by the same general mechanisms as on/off clutches, except that the clutch is engaged and disengaged by varying the flow path of a viscous fluid through the clutch. Hydraulic clutches may be implemented in several ways, such as by a multiple interface clutch or a self-contained pump and motor assembly. Some hydraulic systems allow the cooling system to be remotely mounted, where belting from the crankshaft is impractical.

A cooling fan is mounted to the fan drive. Typically the fan is an axial flow, circular, plastic injection molded device. Alternatively, the fan could be constructed of a lightweight metal. The fan is located in a fan shroud which is attached to the heat exchanger adjacent to the front of the engine. The fan shroud serves as an adapter which directs the flow from the circular fan through the rectangular heat exchangers. A typical spacing between the fan and the fan shroud is about 0.5 inches to 2.0 inches per side. The large tip clearance is necessary due to the fact that the fan is engine mounted and the shroud is frame mounted, with the potential for displacement between the engine and the frame.

The cooling system can be controlled either by discrete sensors on one or more of the cooling sub-systems to turn the fan on and off, or by electronic controls received from the engine control module (ECM). Many diesel power systems currently employed in the vehicular industry are electronically controlled by an ECM, which is part of an overall communications network used to supply operational information to system components of the vehicle. The ECM may additionally be programmed to engage the fan during exhaust braking, unrelated to a cooling need, in order to draw additional horsepower from the diesel power plant to help stop the vehicle.

In most over-the-road trucks, a spring or air engaged on/off clutch is employed along with a solenoid valve, a cooling fan and a fan shroud. Electronic control is usually utilized so that the fan drive turns on and off based on a signal from the ECM. In addition, a pressure switch in the air conditioning system turns the fan on and off as required. The exhaust brake also is operable to control the operation of the fan as a braking aid.

Typical engine speeds are between 600 RPM (low idle) and 2100 RPM (rated speed). Operating engine speeds are usually between 1200 RPM and 1800 RPM. A typical fan ratio is 1.2:1, thus, operating fan speeds are usually between 1440 RPM and 2160 RPM. At the rated engine speed of 2100 RPM, the fan speed can reach 2520 RPM in such a system. In an exemplary system, the typical horsepower (Hp) for a 32-inch diameter fan ranges between about 13 Hp (at 1140 RPM) and 75 Hp (at 2520 RPM), with fan horsepower increasing cubically with fan speed. The power to drive the cooling fan comes from the engine, reducing the power to the system driven by the engine and consuming fuel.

The fan has two basic operating states. Either the fan clutch is engaged and the fan is on, or the fan clutch is disengaged and the fan is off. Fan engagements can occur in response to parameters associated with a number of sub-systems. The ECM controls engagements of the fan to keep engine coolant within an operating window, typically 182° F.–210° F. for an exemplary vehicle system. The ECM will also turn the fan on in order to keep charge air below a threshold temperature, such as 150° F. in an exemplary system. The A/C system's pressure switch is typically engaged at approximately 240 p.s.i. in an exemplary vehicle system, which will turn the fan on until the pressure falls below the set point. Fan engagements due to exhaust brake application generally occur at higher engine speeds.

The duty cycle of the fan and drive is usually between 5% and 20% on time. The on time can be broken down into a percentage of fan engagements due to sub-system or ECM control (see Table 1), and into a percentage of fan engagements at operating speeds (see Table 2). Both of these are important in analyzing the requirements of the fan, because Table 1 describes which system drives cooling system engagement and Table 2, combined with actual on time, allows calculation of energy expended and clutch life. Table 1 and Table 2 are based on fan engagements observed in an exemplary vehicle engine cooling system, and will vary somewhat for different types of vehicles, engines and cooling systems.

TABLE 1

Approximate Percentage of Engagements due to ECM/Sub-System Control.

| System | Coolant | Charge Air | A/C | Exhaust Brake |
|---|---|---|---|---|
| % | 13.8 | — | 45.6 | 40.5 |

TABLE 2

Approximate Percentage of Engagements at Engine Operating Seeds.

| RPM | 700 | 900 | 1100 | 1300 | 1500 | 1700 | 1900 | 2100 | 2300+ |
|---|---|---|---|---|---|---|---|---|---|
| % | 28.6 | 3.4 | 10.0 | 7.3 | 14.3 | 18.7 | 13.2 | 4.1 | 0.3 |

Generally, engagements above 1800 RPM are in the 40.5% exhaust brake category and engagements below 1200 RPM are in the 45.6% A/C category.

Analyzing the relationships in clutch driven cooling systems between the fan speeds (which are related to engine speeds) and the type of cooling needed reveals that the power diverted to the fan is not well tailored to the power required for the type of cooling requested. One of the more problematic situations is when an engine coolant fan request is made during a low engine RPM, high torque condition. In this situation, the engine is experiencing high heat rejection and requires a high fan speed to achieve the required cooling. However, the low engine RPM during this situation would require a high belt ratio (ratio of fan speed to engine speed) to turn the fan at the necessary speed. Since the belt ratio of the fan is fixed, accommodating this condition with a high belt ratio results in overspeeding of the fan during situations where the engine speed is higher, drawing more power than is needed to achieve proper cooling in that situation. This dilemma has been a necessary shortcoming in clutch driven cooling systems, since the power provided to operate the fan comes directly from the engine itself. It would be a useful improvement in the art to provide a cooling system in which the operation of the fan is directly related to the type of cooling requested, without diverting unnecessary power from the other components of the engine. Such a cooling system, employing a novel brushless DC ring motor that provides efficient performance with an advantageous geometry, is the subject of the present invention.

BRIEF SUMMARY OF THE INVENTION

The present invention is a cooling system for a vehicle. The cooling system includes a shroud attachable to a fixed portion of the vehicle. A stator assembly for a brushless DC ring motor is attached to at least one mounting support of the shroud. A cooling fan is piloted on the stator assembly, and includes a ring supporting a plurality of fan blades for sweeping an area inside the shroud. A rotor assembly for the brushless DC ring motor is attached to the ring of the cooling fan. The rotor assembly confronts the stator assembly around an outer diameter of the stator assembly. The cooling system is controlled by an electronic controller to rotate the cooling fan to provide appropriate cooling for the vehicle.

One aspect of the invention is the configuration and operation of the electronic controller. The electronic controller includes a control/communications system operatively connected to an engine control module (ECM) of the vehicle. A DC-to-DC converter is operatively connected to a power source. A commutation switching segment is operatively connected to the DC-to-DC converted and to the control/communications system, and is operable to provide signals for operating the brushless DC ring motor to rotate the cooling fan.

Another aspect of the invention is the configuration of the brushless DC ring motor. The stator assembly of the motor includes a plurality of laminations exposed around the outer diameter thereof. The rotor assembly includes a back-iron ring and a plurality of permanent magnets on an inner diameter of the back-iron ring confronting the plurality of laminations exposed around the outer diameter of the stator assembly.

BRIEF DESCRIPTION OF THE DRAWINGS

The present invention will be further explained with reference to the attached figures, wherein like structure is referred to by like numerals throughout the several views.

While the above-identified drawing figures set forth preferred embodiments of the invention, other embodiments are also contemplated, as noted in the discussion. In all cases, this disclosure presents the present invention by way of representation and no limitation. It should be understood that numerous other modifications and embodiments can be devised by those skilled in the art which fall within the scope and spirit of the principles of this invention.

DETAILED DESCRIPTION

Figure 1:
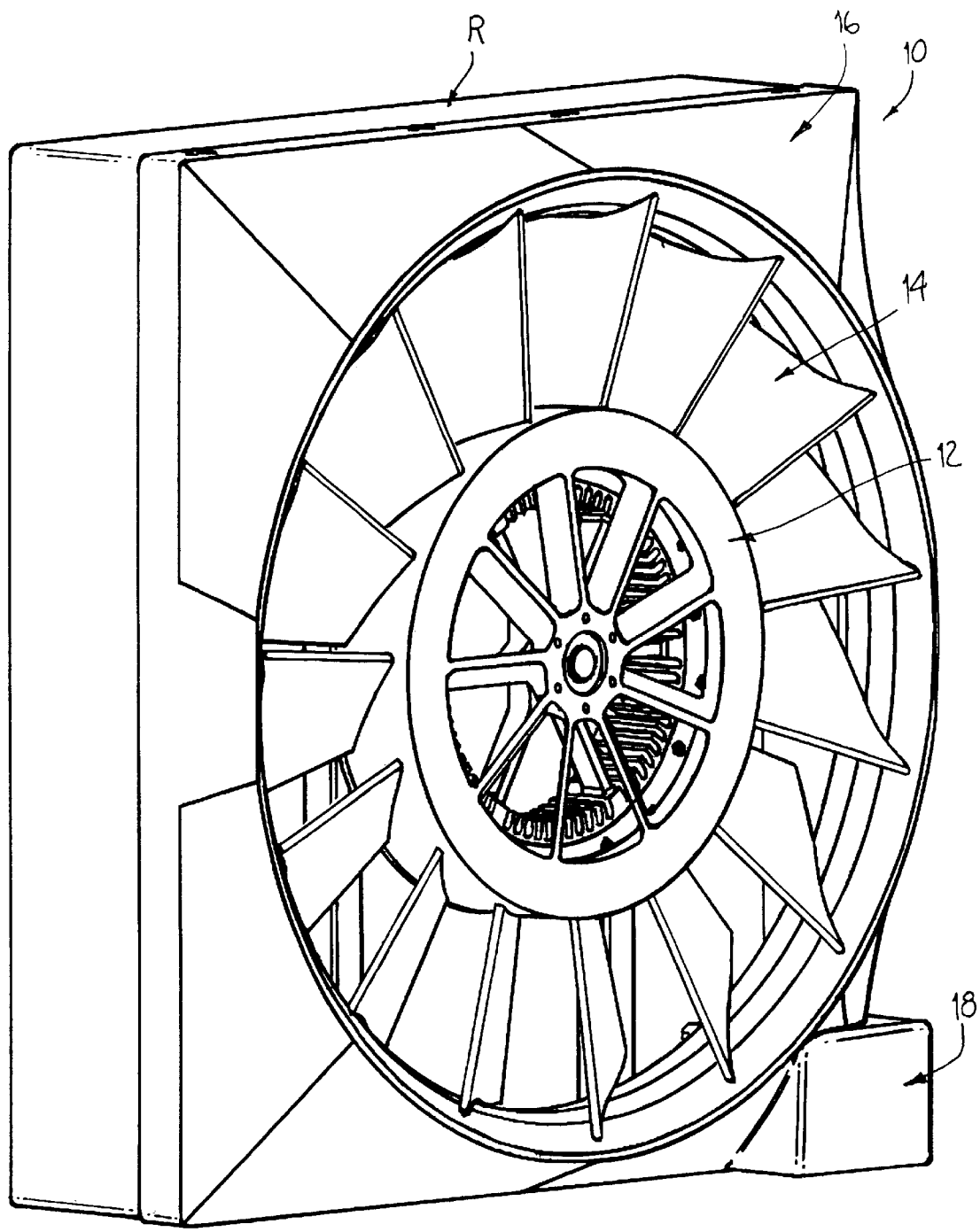
FIG. 1 is a perspective view of an exemplary brushless DC ring motor cooling system according to the present invention.

FIG. 1 is a generally frontal perspective view of brushless DC ring motor cooling system 10 according to the present invention. Cooling system 10 includes brushless DC (BLDC) ring motor 12, fan 14, fan shroud 16 and controller 18. Shroud 16 is physically mountable to a fixed portion of a vehicle such as vehicle radiator R, motor 12 is mounted to shroud 16, and fan 14 is integrally connected to motor 12. Because brushless DC ring motor cooling system 10 is not belted or otherwise connected to the rotating engine crankshaft, radiator R and cooling system 10 can be mounted in a number of locations on the vehicle remote from the engine. Controller 18 is mounted on fan shroud 16, and is operatively connected to the engine control module (ECM) of the vehicle system in which cooling system 10 is utilized. Controller 18 is also coupled to a power supply (not shown), and is connected to supply appropriate control signals for operating motor 12.

Figure 2:
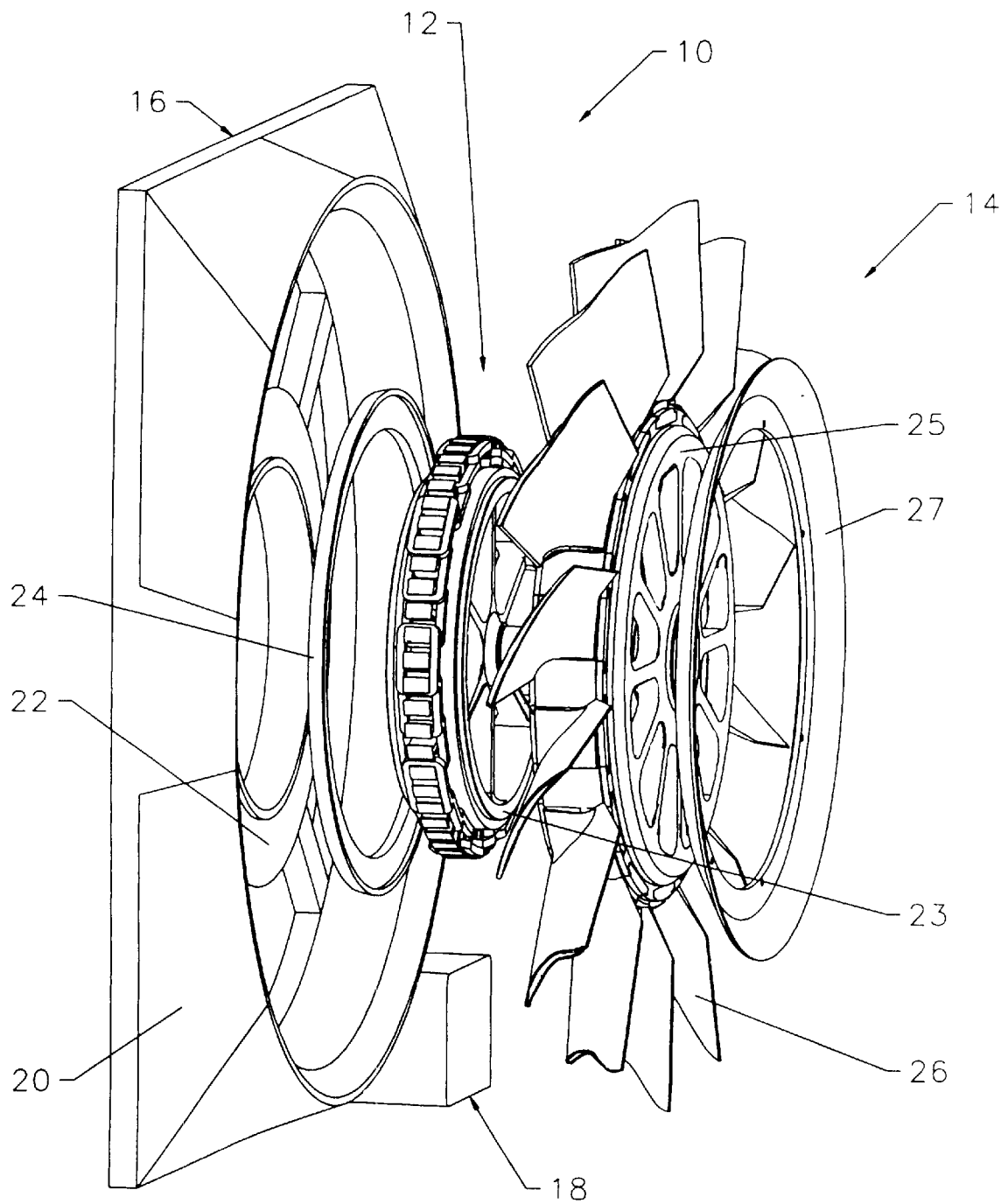
FIG. 2 is an exploded perspective view of a brushless DC ring motor cooling system according to a first exemplary embodiment of the present invention.

FIG. 2 is an exploded perspective view of brushless DC ring motor cooling system 10, showing the construction and relationships of motor 12, fan 14 and shroud 16 in more detail. Shroud 16 includes outer frame 20 and motor mounting ring 22. Shroud 16 is mountable to a vehicle radiator in an exemplary configuration. Motor 12 includes stator assembly 23 attached to backing plate 24, which is in turn attached to motor mounting ring 22 for mounting stator assembly 23 to shroud 16. Rotor assembly 25 is supported and configured around the outer circumference of stator assembly 23 so that the inner circumference of rotor assembly 25 faces and confronts the outer circumference of stator assembly 23 across a gap therebetween. Rotor assembly 25 supports a plurality of fan blades 26 around its outer perimeter. In the exemplary embodiment shown in FIG. 2, fan blades 26 are insertable and removable into the body of rotor assembly 25 for easy replacement. Retaining ring 27 may be employed, removably attached to rotor assembly 25, to retain fan blades 26 in position for operation of cooling system 10.

Figure 3:
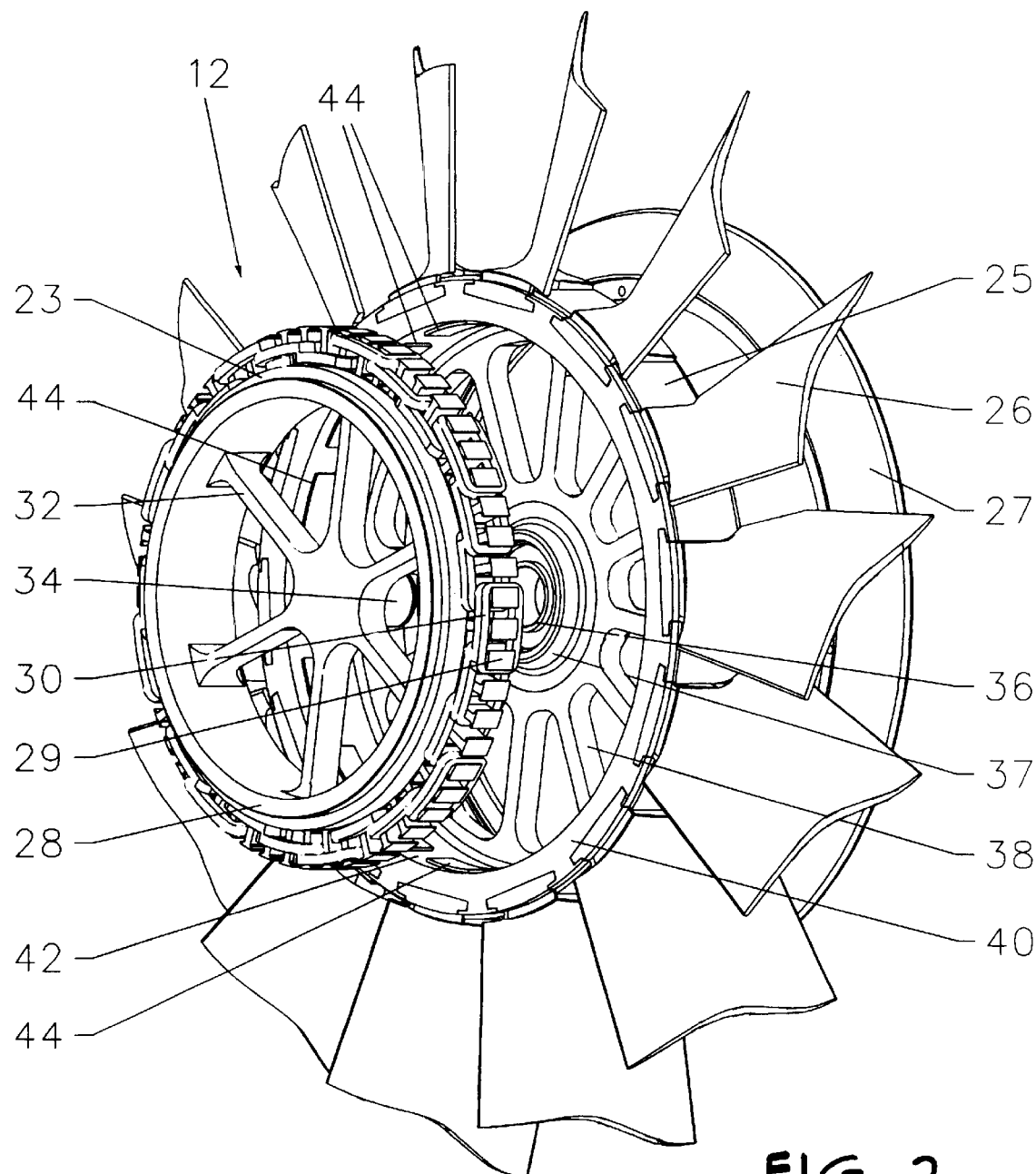
FIG. 3 is an enlarged exploded perspective view of the brushless DC ring motor cooling system shown in FIG. 2, as viewed from a rearward perspective.
Figure 4:
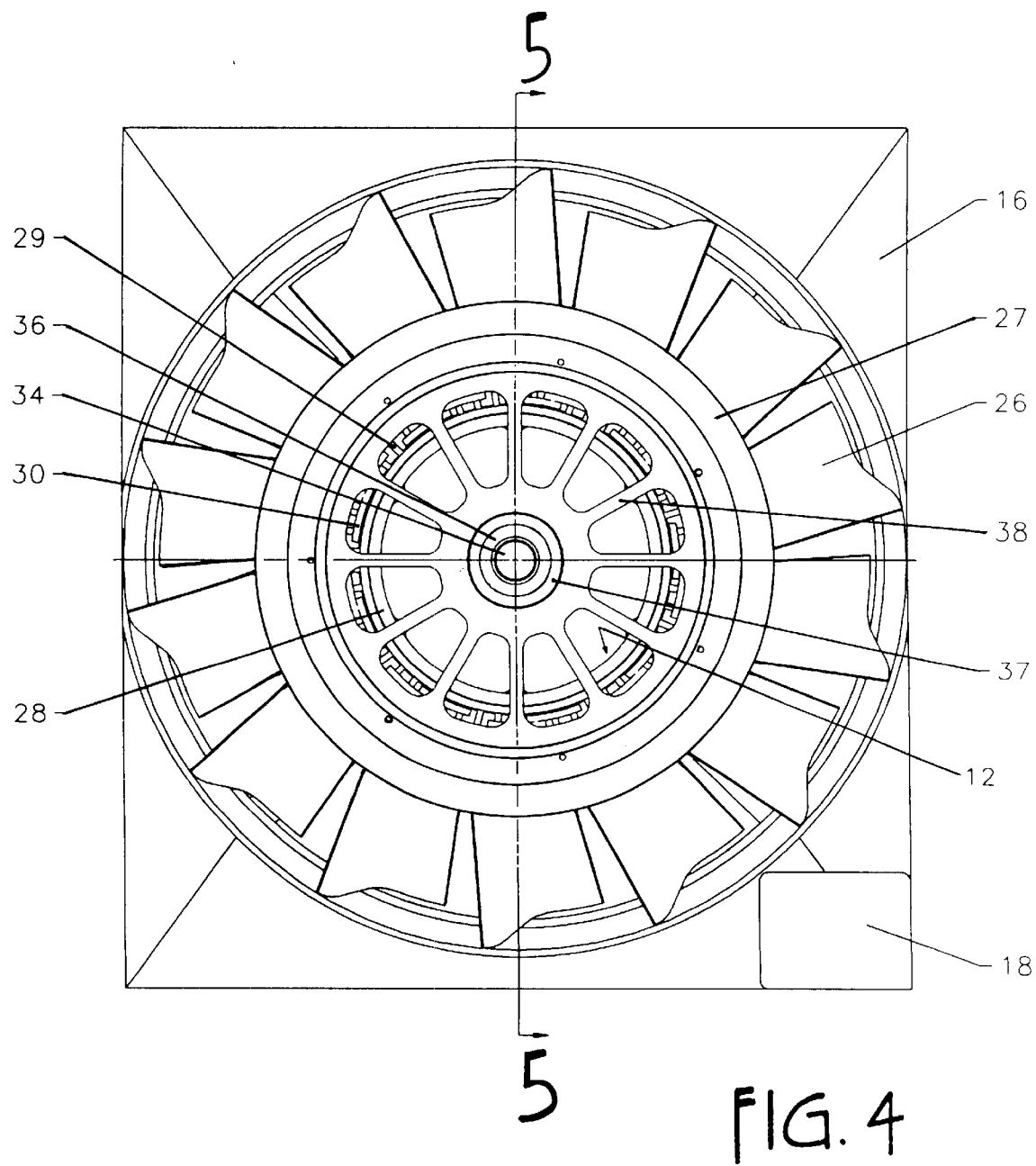
FIG. 4 is a front elevational view of the brushless DC ring motor cooling system shown in FIG. 2.
Figure 5:
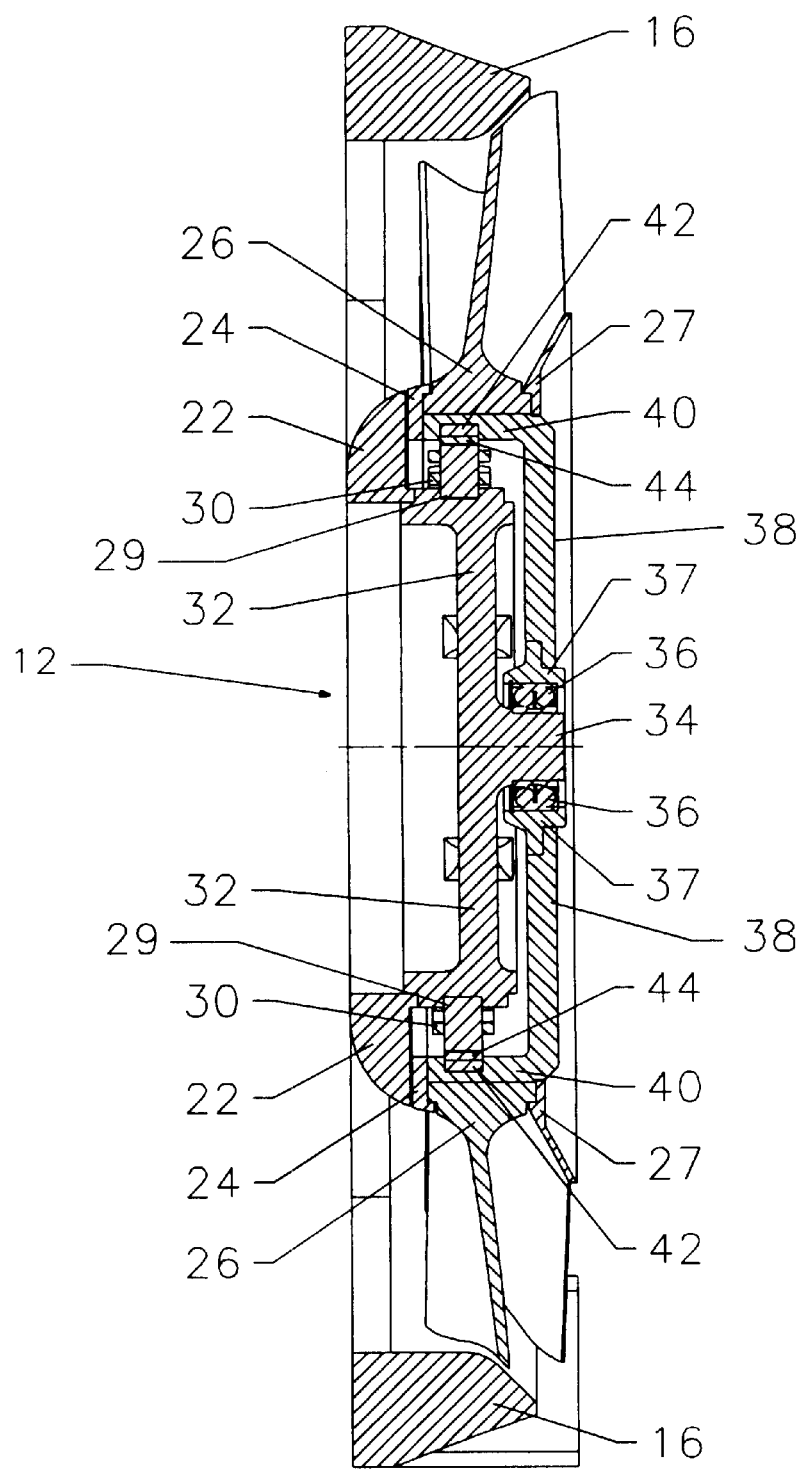
FIG. 5 is a cross-sectional view taken along line 5—5 of FIG. 4.

FIG. 3 is a an exploded perspective view (from a generally rearward perspective), FIG. 4 is a front elevational view, and FIG. 5 is a cross-sectional view taken along line 5—5 of FIG. 4, of cooling system 10, illustrating the construction of motor 12 and fan 14 in more detail. Motor 12 is a three phase motor arranged as a ring. Aluminum core 28 of stator assembly 23 supports a plurality of laminations 29 and windings 30. In an exemplary embodiment, laminations 29 and windings 30 are configured with eighteen poles, and laminations 29 are integrally formed with aluminum core 28 and covered by a potting compound so that only an end of each of the poles is exposed. Windings 30 are configured to wrap around laminations 29 in a three phase arrangement generally known in the art. The three wires of windings 30 used to wind the phases of motor 12 preferably exit the potting compound through a single point, and through holes in the potting compound allow for mounting of stator assembly 23 onto mounting ring 22 while accommodating electrical connection to windings 30.

A plurality of spokes 32 extend from aluminum core 28 all the way to the center of the ring of stator assembly 23, meeting in the ring center to support journal 34, which extends along the axis of the ring. Bearing set 36 is located on one end of journal 34 to support rotor assembly 25. Rotor assembly 25 has center hub 37, piloted by bearing set 36, and a plurality of spokes 38 which extend radially outward from hub 37. In one exemplary embodiment, spokes 38 are configured in an airfoil shape to provide cooling to the inner radial portions of motor 12. Spokes 38 support ring 40, which extends back over the faces of the exposed poles of laminations 29 of stator assembly 23. Back-iron ring 42 and a plurality of permanent magnets 44 are located between the pole faces of laminations 29 of stator assembly 23 and ring 40 of rotor assembly 25. In an exemplary embodiment, permanent magnets 44 are equally spaced around back-iron ring 42. Fan blades 26 are removably attached around rotor ring 40 and project radially outward from rotor ring 40. Fan blades 26 may be configured in a number of shapes or orientations known in the art to generate a desired pattern of air flow when rotor assembly 25 is rotated.

In operation, power is delivered by controller 18 to motor 12, causing rotor assembly 25 to turn radially with respect to stator assembly 23. Fan blades 26 and spokes 38 therefore turn as well, with fan blades 26 performing the system cooling function of the fan and spokes 38 providing air flow through the open center of motor 12. The air flow through the center of motor 12 passes through spokes 32 of stator assembly 23 for cooling of stator assembly 23.

Fan shroud 16 is molded or formed so that it is attachable to a vehicle radiator and provides support for motor 12 and fan 14. The inside diameter profile of shroud 16 is designed to cooperate with the outer diameter profile of fan 14. The tip clearance between fan blades 26 and shroud 16 is quite small (no greater than about 0.125 inches in an exemplary embodiment), due to the fact that the assembly of motor 12 and fan 14 is directly mounted to shroud 16. The corner of shroud 16, outside of the swept area of fan 14, is used to house controller 18, which is comprised of the power and communication electronics required to operate motor 12. In an exemplary embodiment, a three-conductor wire harness is routed through a selected portion of the mounting supports of shroud 16 to provide power to motor 12.

Laminations 29 of motor 12 are made up of steel sheets. In an exemplary embodiment, there are 95 to 100 steel sheets around the outer circumference of aluminum core 28, each having a thickness of just under 0.01 inches. The gaps between adjacent ones of laminations 29 are insulated, and laminations 29 are stacked and permanently held together to form stator assembly 23.

The inner diameter of ring 40 of rotor assembly 25 is machined or otherwise formed to accept steel back-iron ring 42. In an exemplary embodiment, the back-iron material of ring 42 is pressed into rotor ring 40. Alternatively, rotor ring 40 is formed by a method such as injection molding and back-iron ring 42 may be inserted during the formation/molding process. In an exemplary embodiment, eighteen permanent magnets 44 are arranged on back-iron ring 42. Magnets 44 magnetically adhere to back-iron ring 42 as they are placed. In one exemplary embodiment, an indexing ring may be attached to back-iron ring 42 and used to properly space magnets 44 and hold them in place.

According to an exemplary assembly method of cooling system 10, shroud 16 is initially mounted to the vehicle radiator. Stator assembly 23 is then mounted to mounting ring 22 and electrically coupled to controller 18. Rotor assembly 25 is assembled to stator assembly 23 by pressing bearing set 36 of rotor assembly 25 onto exposed journal 34 of stator assembly 23 and fastening them with a retaining ring. Cooling fan 14 is either integral to rotor assembly 25 or is attached to rotor assembly 25. Finally, controller 18 is electrically connected to a power supply (not shown) and to the engine ECM.

Stator assembly 23 and rotor assembly 25 are preassembled assemblies, forming brushless DC ring motor 12 as a device that is essentially separate from the assembly of cooling fan 14. Fan blades 26 are insertable and removable from rotor assembly 25 without affecting any components of motor 12. This feature of the present invention minimizes the effect of occasional breakage of portions of the fan such as the fan blades, by allowing replacement of parts of the fan in a manner that does not require the expertise and tools that would be necessary to disassemble motor 12.

In the exemplary embodiment shown in FIGS. 2–5, fan blades 26 are insertable and removable from rotor ring 40. One option for the configuration of fan blades 26 is to arrange fourteen blades around the outer perimeter of ring 40. In this arrangement, fan blades 26 have a small clearance from shroud 16 and from each other. Another option is to partially overlap fan blades 26 with each other, allowing a greater number of fan blades 26 to be employed. The choice of the shape, arrangement and orientation of fan blades 26 is made in order to achieve a desired air flow pattern. The configuration of the present invention enables a very small clearance between fan blades 26 and shroud 16, with a clearance of about one-eighth of an inch in an exemplary embodiment.

Figure 6:
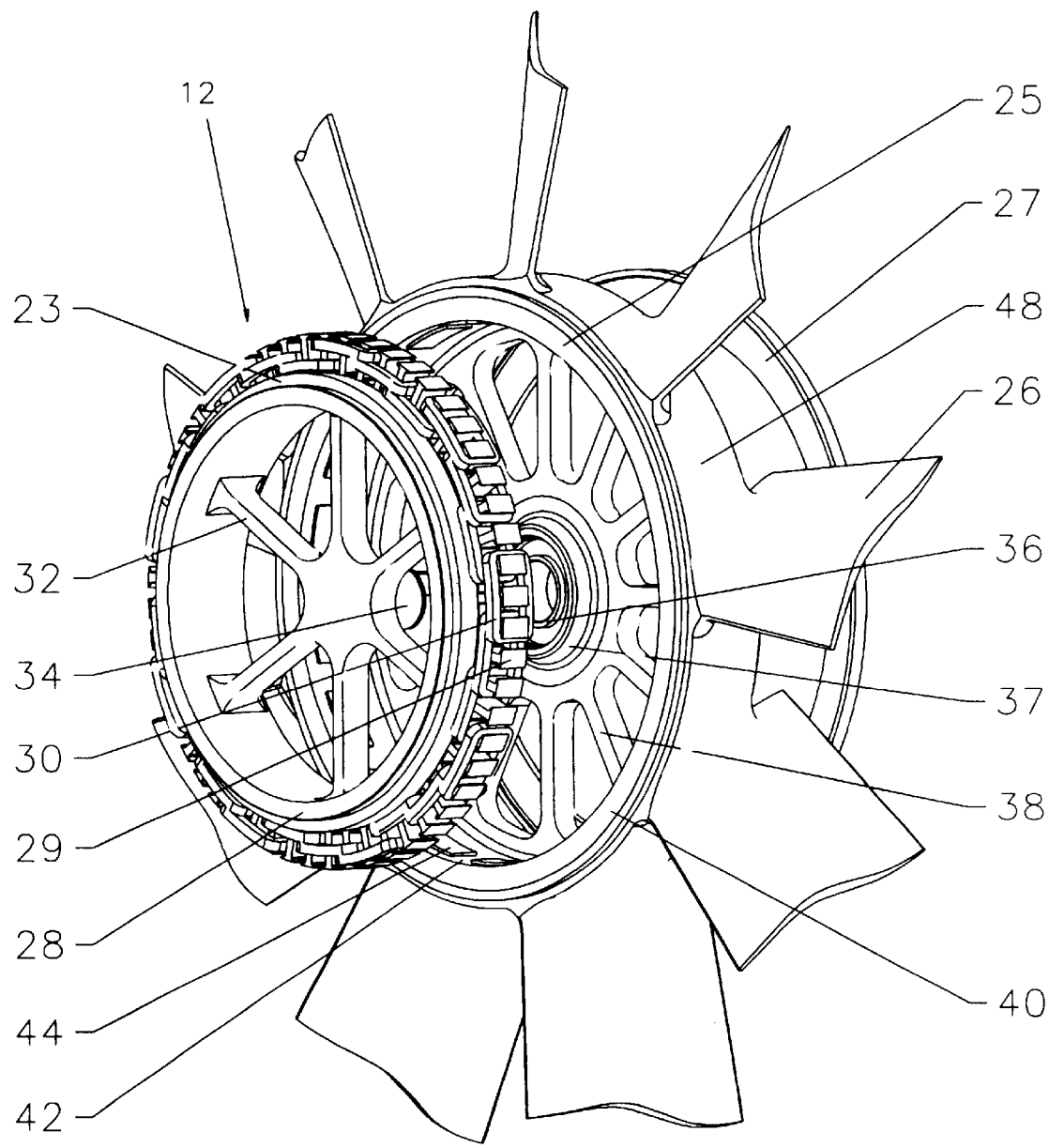
FIG. 6 is an enlarged exploded perspective view of a brushless DC ring motor cooling system according to a second exemplary embodiment of the present invention.
Figure 7:
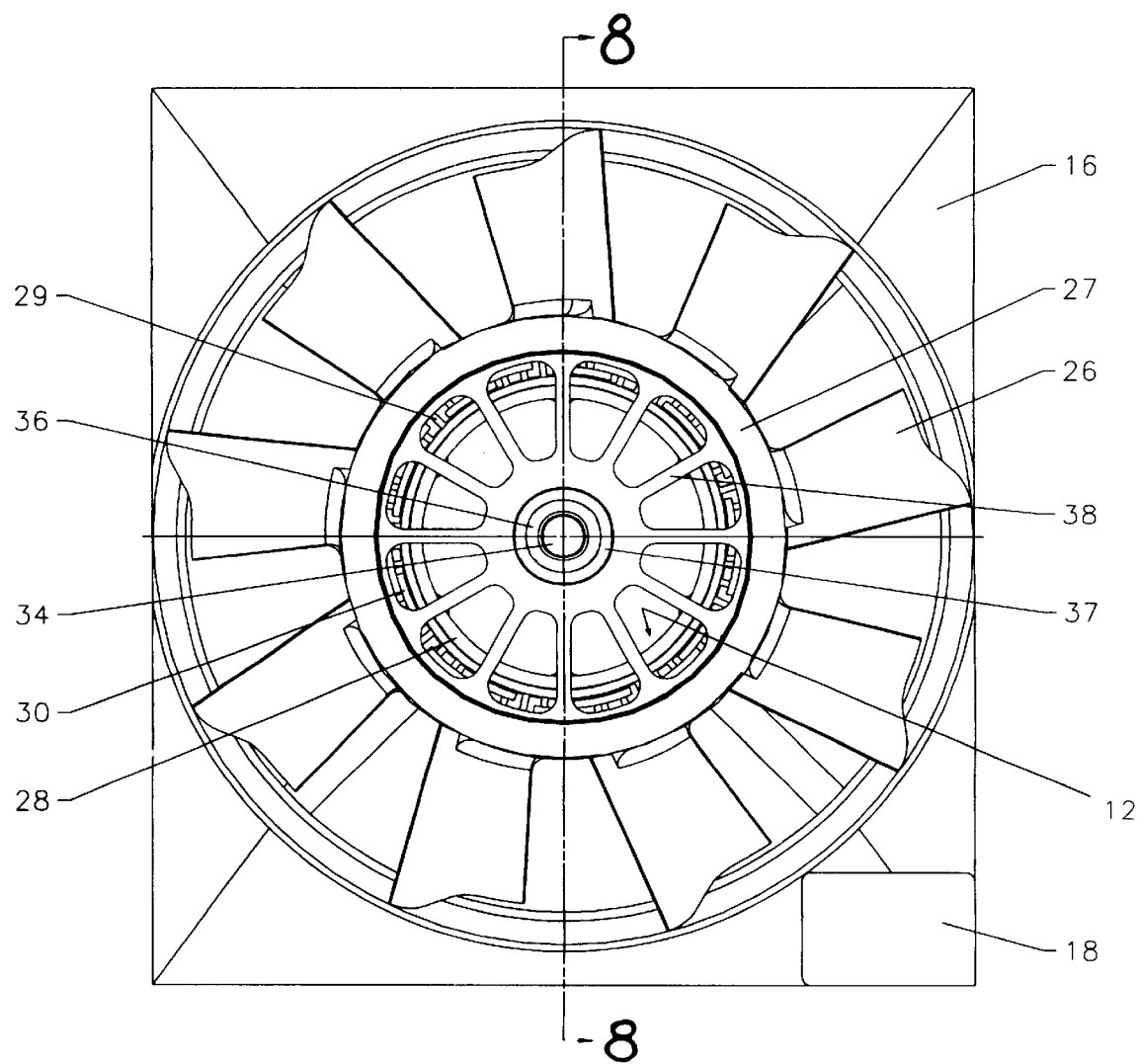
FIG. 7 is a front elevational view of the brushless DC ring motor cooling system shown in FIG. 6 with a shroud.
Figure 8:
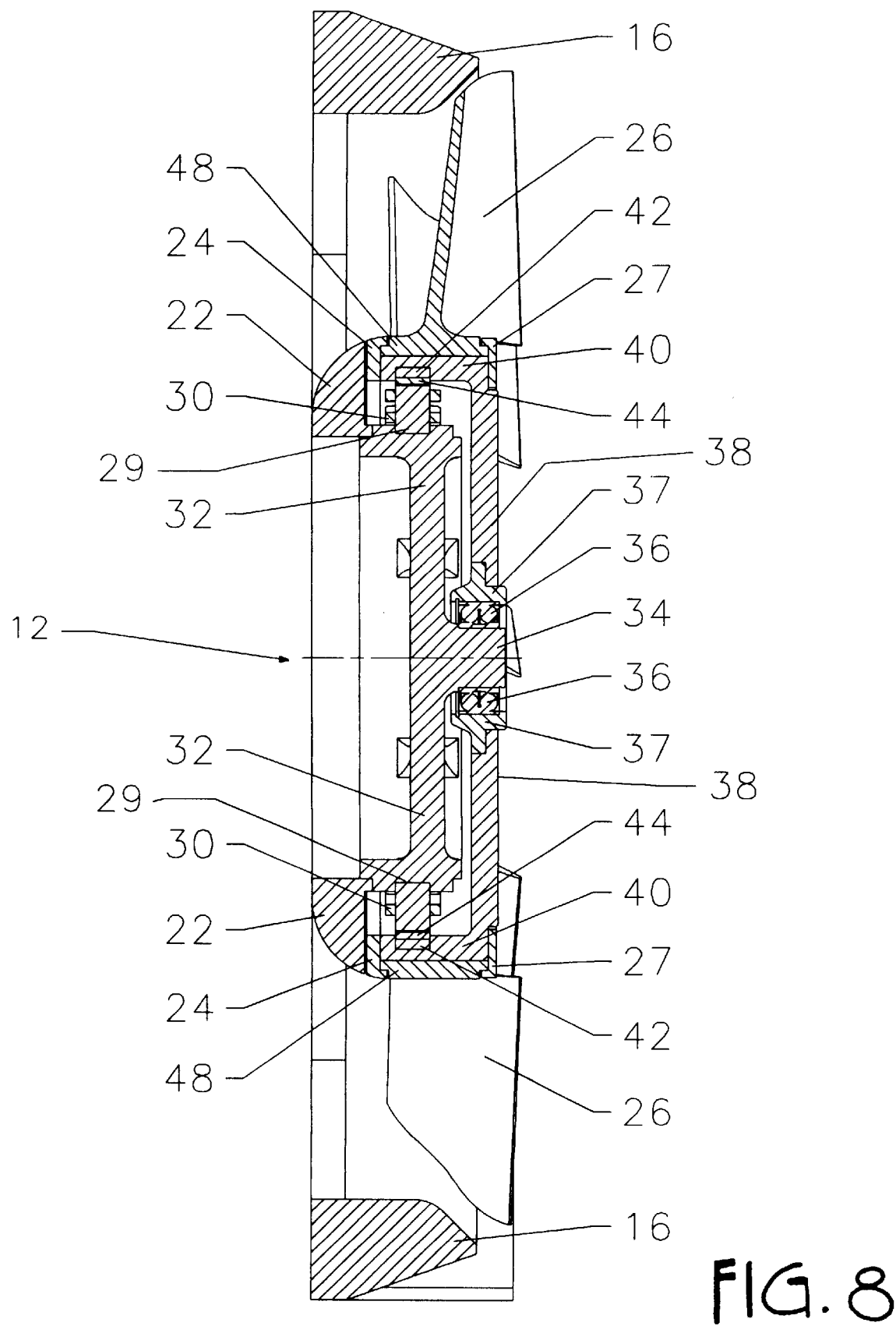
FIG. 8 is a cross-sectional view taken along line 8—8 of FIG. 7

FIG. 6 is a an exploded perspective view (from a generally rearward perspective), FIG. 7 is a front elevational view, and FIG. 8 is a cross-sectional view taken along line 8—8 of FIG. 7, of cooling system 10 employing an alternate configuration of cooling fan 14. Specifically, the embodiment shown in FIGS. 6–8 employs cooling fan 14 that includes fan hub 48 supporting fixedly attached fan blades 26 around its outer perimeter. Fan hub 48 and fan blades 26 are attachable and removable from rotor ring 40 as an entire assembly, again without affecting any components of motor 12. In an exemplary embodiment, retaining ring 27 is employed to secure fan hub 50 to rotor ring 40. However, other embodiments would not necessarily require retaining ring 27 for this purpose, instead utilizing another mechanism for removably attaching fan hub 50 to rotor ring 40.

Figure 9:
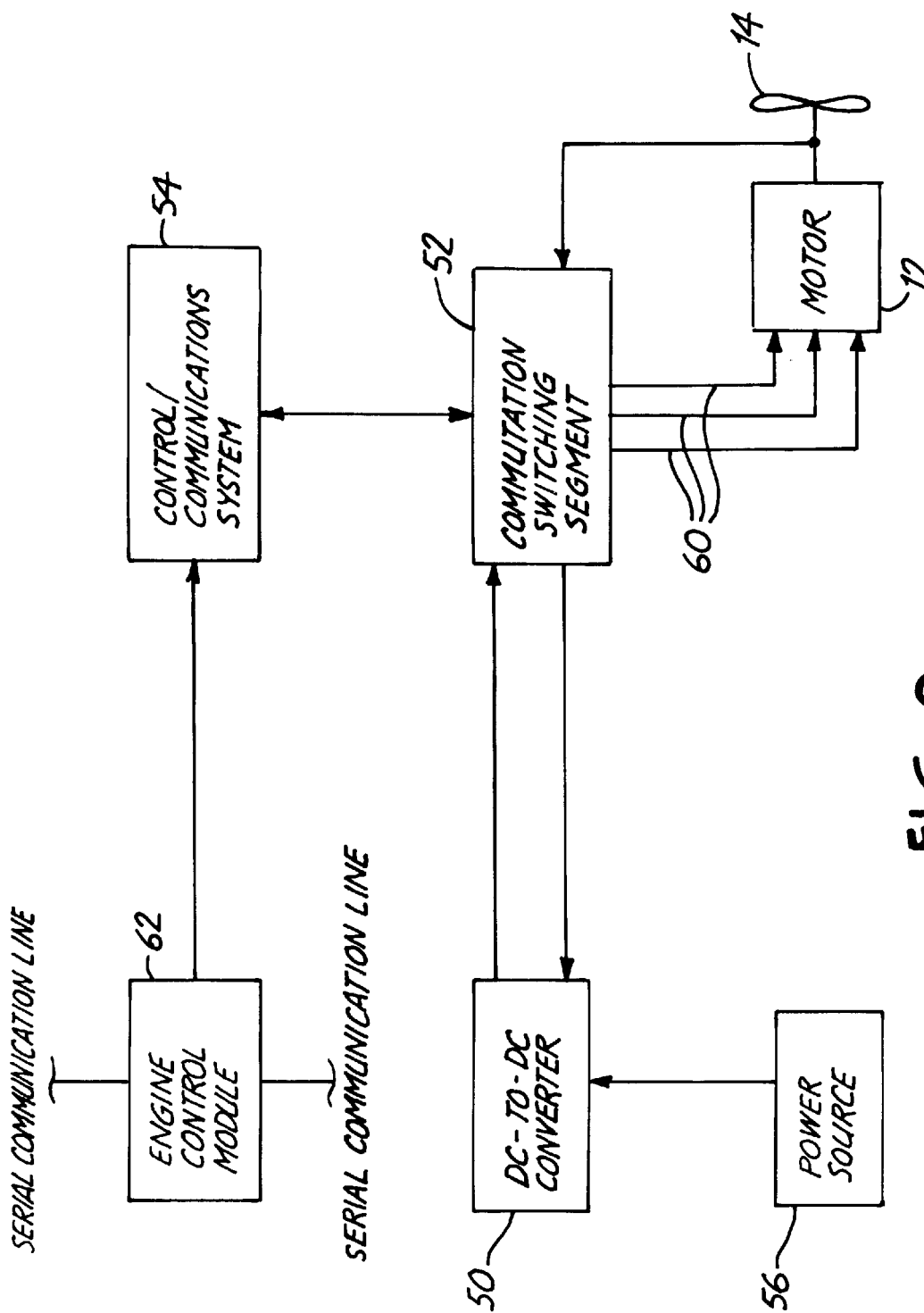
FIG. 9 is a block diagram illustrating the electronic drive and controls for the brushless DC ring motor cooling system of the present invention.

FIG. 9 is a block diagram illustrating the electronic drive and controls for the brushless DC motor of the present invention. The three main parts of the electronics of the system are DC-to-DC converter 50, commutation switching segment 52 and control/communications system 54. DC-to-DC converter 50 and switching segment 52 make up the drive section of the electronics, while control/communications system 54 serves as an interface for signals received from ECM 62 of the engine.

DC-to-DC converter 50 converts the low DC voltage and high current available from power source 56, which in an exemplary embodiment is the battery of the vehicle, to high DC voltage and low current suitable for use by BLDC ring motor 12. In general, DC-to-DC converter 50 provides a signal having at most the same total power of the signal provided by power source 56, where power (P) is defined by the relationship P=VI, where V represents the voltage of the signal and I represents the current of the signal. The maximum speed of cooling fan 14 is therefore ultimately related to the amount of power provided by power source 56. In an exemplary embodiment, DC-to-DC converter 50 is a resonant converter design which features a soft switching arrangement for the lowest possible conversion losses, such as is described in an article entitled "Novel soft-switching dc—dc converter with full ZVS-range and reduced filter requirement" by R. Ayyanar and N. Mohan, published in the IEEE Transactions on Power Electronics, March 2001, volume 16, pp. 184–200, and incorporated herein by reference. DC-to-DC converter 50 is also capable of varying the output voltage over a 2 to 1 range (that is, reducing the output voltage by up to half), in response to control signals relayed by commutation switching segment 52 from control/communications system 54. The output side of DC-to-DC converter 50 is the drive's DC bus, and the actual wires carrying the high voltage for the three phases of motor 12 are represented as rail 60.

Commutation switching segment 52 of the control includes one or more switches that control the voltage and current to each of the phases of motor 12. These switches are arranged in a three phase full bridge configuration between the DC bus rail and ground, in a manner generally known in the art.

Control/communications system 54 of the electronic control is a low voltage device that functions to convert the control signal from ECM 62 of the engine to the proper fan speed by controlling the drive section of the electronic control. The control signal from ECM 62 is typically in the form of a pulse width modulated signal with the pulse width being proportional to the requested fan speed, or in the form of a digital message received over the vehicle's serial communications system. Control/communications system 54 converts this signal appropriately and varies the pulse width of the switches in the drive section of the electronics control, until the desired fan speed is reached.

The speed of a BLDC motor is proportional to the driving voltage. In traditional systems for driving a BLDC motor, the DC bus voltage is fixed and the commutation bridge switches are pulse width modulated to control the motor's speed. However, the configuration of the present invention utilizes a dual-stage speed adjustment system. DC-to-DC converter 50 has a variable output level, controlled by input signals relayed by commutation switching segment 52 from control/communications system 54, which is employed to selectively reduce the bus voltage to give a gross adjustment of speed. The commutation bridge switches of commutation switching segment 52 are then used for fine speed adjustment. This control arrangement reduces the power lost in the bridge switches, since the power lost in these switches is proportional to the DC bus voltage.

As mentioned above, signals from the vehicle engine requesting operation of the cooling fan generally come in the form of a pulse width modulated (PWM) signal generated by ECM 62 or a digital signal carried by the serial communication system of the vehicle and shared by a number of vehicle components including ECM 62. The PWM signal generated by ECM 62 has a signal range that is proportional to the amount of cooling required by the vehicle's cooling system. In one exemplary embodiment, the working speed range of the cooling system of the present invention is 0–1800 RPM. In this embodiment, if the PWM signal is 50% of its maximum, the motor and fan will turn at 900 RPM. If the PWM signal is 90% of its maximum, the motor and fan will turn at 1620 RPM. By employing the electric motor drive of the present invention, this linear, proportional relationship can be produced, with fan speeds that are related to the amount of cooling requested by the engine rather than to the speed of the engine, as would be the case in clutch driven systems.

Where digital signals from the serial communication line of the vehicle are used, more complex and varied information is available. For example, charge air intercooler temperature and engine coolant temperature are represented by digital, real-time signals passed along the serial communication line that is shared by ECM 62. Obtaining and interpreting these temperature signals through suitable sensors is generally known in the art, and those functions are performed in an exemplary embodiment by control/communications system 54. Control/communications system 54 is operable to utilize these parameters to proactively determine the necessary cooling requirements for the engine, and along with commutation switching segment 52 and DC-to-DC converter 50, control the rotational speed of cooling fan 14 accordingly. In one exemplary embodiment, control/communications system 54 may employ an algorithm for determining the cooling requirements for the engine, and thus the appropriate speed of cooling fan 14, similar to the algorithm disclosed in U.S. application Ser. No. 09/349,274 filed Jul. 7, 1999 for "Control System For Cooling Fan Assembly Having Variable Pitch Blades" by B.

Palmer, X. Feng and C. Nelson. U.S. application Ser. No. 09/349,274 is hereby incorporated by reference and made a part of this application.

Figure 10A:
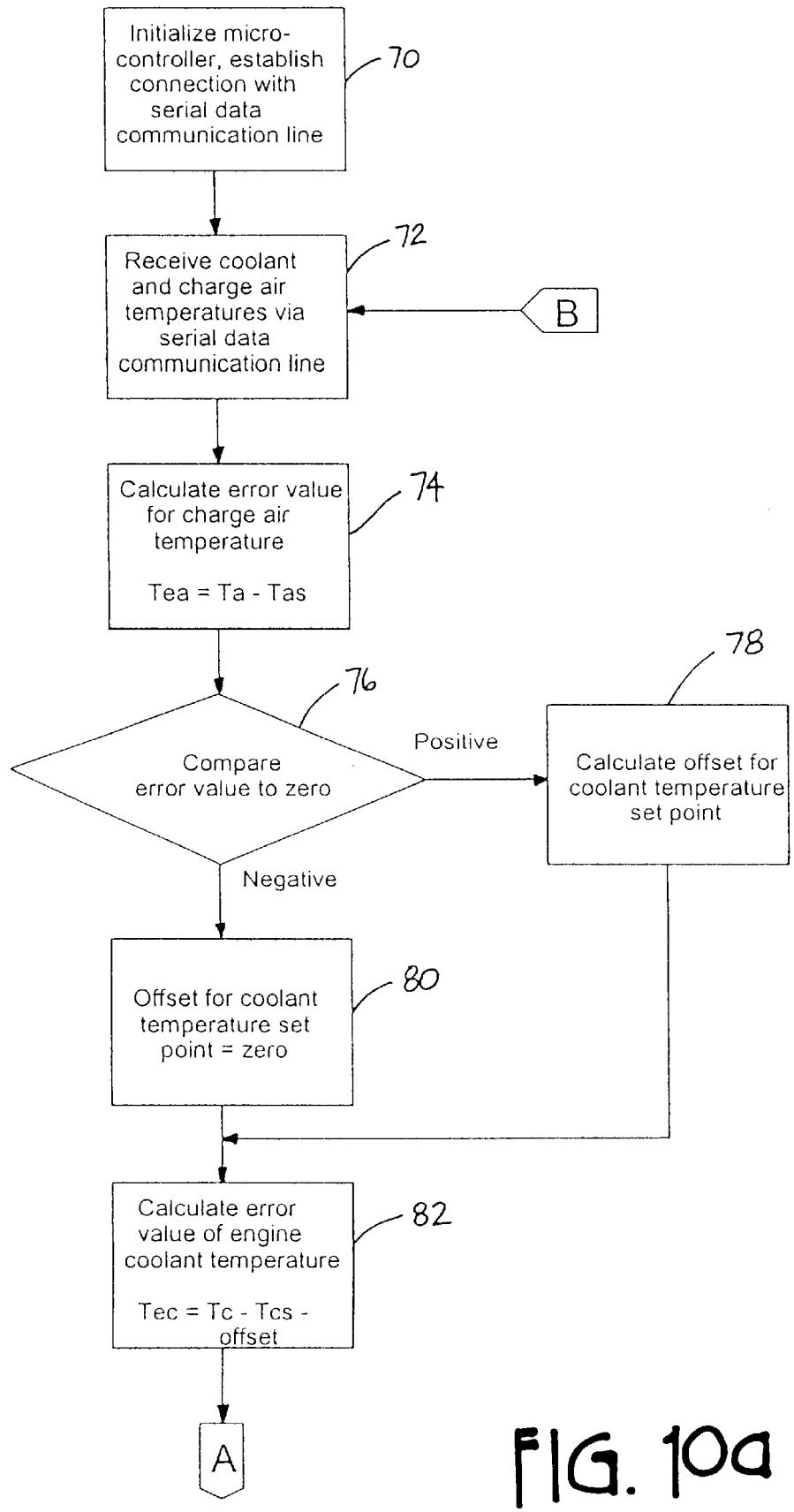
FIGS. 10a and 10b are flow diagrams of an exemplary algorithm for controlling the speed of the brushless DC ring motor cooling system of the present invention based on temperature signals obtained from a vehicle serial communication line.
Figure 10B:
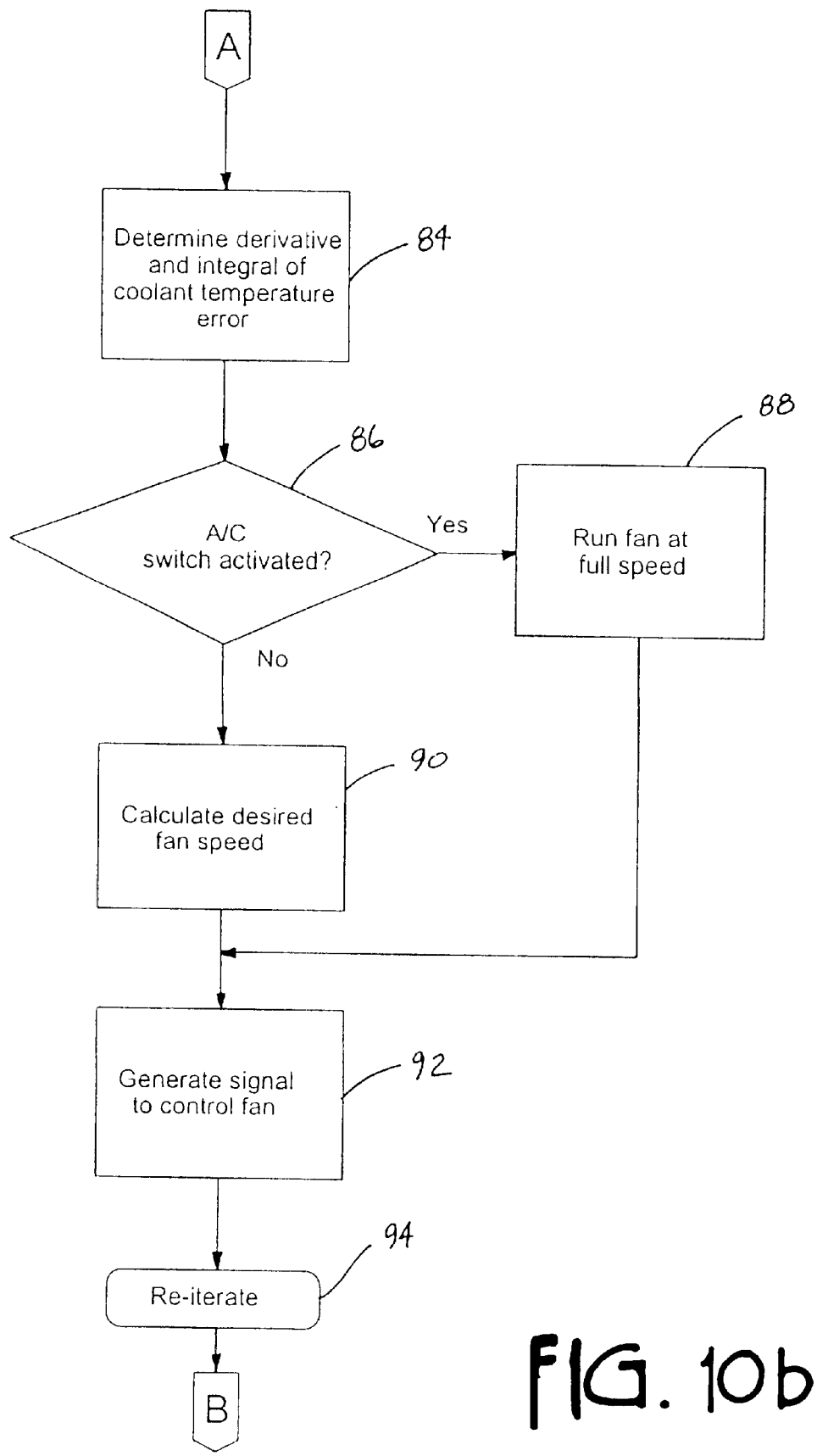

An exemplary algorithm for controlling the speed of cooling fan 14 based on temperature signals obtained from the vehicle serial communication line is shown in the flow diagram of FIGS. 10a and 10b. The algorithm shown in FIGS. 10a and 10b assumes that control/communications system 54 (FIG. 9) employs a microcontroller of a type generally known in the art. The microcontroller is initialized and a connection with the serial data communication line of the vehicle is established at block 70. Following initialization, the microcontroller obtains the temperature of the engine coolant (Tc) and the temperature at the outlet of the charge air cooler (Ta), i.e., the intake manifold temperature of the engine, at block 72. Once these values are read, the microcontroller calculates an error value for the charge air temperature by subtracting a set point value from the charge air temperature (Tea=Ta−Tas) at block 74. This error value is compared to zero at decision block 76, and if the value is greater than zero (i.e., positive), an offset is calculated for the coolant temperature set point (offset=Kc*Tea) at block 78. If the error value for the charge air temperature is less than zero (i.e., negative), the offset for the coolant temperature set point is established as zero at block 80. Next, the microcontroller calculates an error value (Tec) of the engine coolant temperature relative to a set point value (Tcs), such that the engine coolant temperature is equal to the coolant temperature minus the set point value minus the established offset (Tec=Tc−Tcs−offset) at block 82. The microcontroller then determines the rate of change (i.e., derivative) of the coolant error (DTec=(Tec$_0$−Tec$_{-1}$)/time lapse) and the integral of the coolant error (ITec=ITec (previous)+(Tec*time lapse)) at block 84 (FIG. 10b). It is then determined whether the air conditioning (A/C) switch is activated at decision block 86. Id the A/C switch is activated, the fan simply needs to be run at full speed, as indicated by block 88. If the A/C switch is not activated, the microcontroller calculates the fan speed needed to service the cooling need of the system, as indicated by block 90. The fan speed is calculated based on the engine coolant temperature error (Tec), the derivative of the coolant temperature error (DTec) and the integral of the coolant temperature error (ITec), according to a proportional-integral-derivative (PID) control scheme of a type generally known in the art. A signal is generated at block 92 to control the cooling fan to rotate at the calculated speed, and the algorithm is re-iterated as indicated by block 94, returning to block 72 (FIG. 10a) after an optional delay is introduced. Variations to this control algorithm, within the spirit and scope of the present invention, will be apparent to those skilled in the art.

At peak torque (1200 engine RPM in an exemplary vehicle system), when typically greater cooling is required, the cooling system of the present invention can be operated to provide its maximum fan speed. In order to provide the necessary power during this condition, the cooling fan can temporarily draw its power from the vehicle's batteries or another stored power source, meeting the cooling requirement without taking power from the vehicle's drive line. After the peak torque condition (such as a hill climb) is complete, the vehicle's electrical system can replace power in the batteries. If the A/C system calls for fan engagement, the cooling fan can respond with a preset fan speed. The cooling system of the present invention can provide any fan speed at any time for any system, in a range between 0 and the maximum RPM.

The cooling system's motor and control design also allows for driving the fan in reverse at any speed from 0 to the maximum RPM. This capability is particularly useful for systems in which lodging of debris in the radiator is a problem, such as heavy industrial and agricultural systems. The cooling system motor may be periodically controlled to drive the fan in reverse to expel any debris in the radiator, or may be controlled manually or automatically to drive the fan in reverse in response to detection of debris in the radiator, so that the debris can be expelled. Other control arrangements for reverse driving of the fan will be apparent to those skilled in the art.

The present invention provides an electric cooling system for use in a vehicle in an exemplary embodiment. The electric cooling system employs a brushless DC ring motor having a rotational speed that is controllable independent of the speed of the vehicle engine, allowing power to be utilized more efficiently by the cooling system in a manner that is specifically tailored to dynamic cooling requirements. The motor is controlled by an electronic controller that receives either a pulse width modulated (PWM) signal from the engine control module (ECM) or digital signals from the vehicle's serial communication line and responds with a signal for operating the motor at a speed that will provide appropriate cooling.

Although the present invention has been described as it pertains to the exemplary embodiment of a cooling fan for a vehicle, it should be understood by those skilled in the art that there are several features of the invention whose novelty does not depend on the particular details of the cooling fan. For example, the geometric configuration of motor 12 is itself believed to be novel. The present invention should therefore be understood for the teachings it provides to those skilled in the art, without limitation to the particular exemplary embodiments described herein. Workers skilled in the art will recognize that changes may be made in form and detail without departing from the spirit and scope of the invention.

What is claimed is:

1. A brushless DC ring motor comprising:
   a stator assembly having an outer surface and a plurality of laminations exposed around the outer surface;
   a rotor assembly piloted on the stator assembly, the rotor assembly having a back-iron ring and a plurality of permanent magnets on an inner surface of the back-iron ring confronting the plurality of laminations exposed around the outer surface of the stator assembly;
   a shroud attachable to a fixed portion of a vehicle, the shroud including at least one mounting support, wherein the stator assembly is attached to said at least one mounting support and
   a cooling fan piloted on the stator assembly, the cooling fan including a support ring supporting a plurality of fan blades for sweeping an area inside the shroud.

2. The brushless DC ring motor of claim 1, wherein a clearance between the shroud and the plurality of fan blades of the cooling fan is no greater than about one-eighth of an inch.

3. The brushless DC ring motor of claim 1, wherein the plurality of fan blades are individually removable from the support ring of the cooling fan.

4. The brushless DC ring motor of claim 1, wherein the support ring supporting the plurality of fan blades is removable from the cooling fan.

5. The brushless DC ring motor of claim 1, wherein the fixed portion of the vehicle is a radiator.

6. The brushless DC ring motor of claim 5, wherein the rotor assembly is drivable to rotate the cooling fan in a first direction for cooling and in a second direction for expelling debris from the radiator.

7. The brushless DC ring motor of claim 5, wherein the radiator is mounted remotely from an engine of the vehicle.

8. The brushless DC ring motor of claim 1, further comprising an electronic controller operatively connected to an engine control module (ECM) of the vehicle for controlling operations of the brushless DC ring motor.

9. The brushless DC ring motor of claim 8, wherein the electronic controller comprises:

- a control/communications system operatively connected to the ECM of the vehicle;
- a DC-to-DC converter operatively connected to a power source; and
- a commutation switching segment operatively connected to the DC-to-DC converter and to the control/communications system, the commutation switching segment being connected to provide signals for operating the brushless DC ring motor.

10. The brushless DC ring motor of claim 9, wherein the control/communications system is operable to receive pulse width modulated (PWM) signals from the ECM of the vehicle to control the brushless DC ring motor.

11. The brushless DC ring motor of claim 9, wherein the control/communications system is operable to receive digital signals from a serial line of the ECM of the vehicle to control the brushless DC ring motor.

12. The brushless DC ring motor of claim 9, wherein an output of the DC-to-DC converter is variable for gross adjustment of a speed of the brushless DC ring motor and an output of the commutation switching segment is variable for fine adjustment of the speed of the brushless DC ring motor.

13. The brushless DC ring motor of claim 9, wherein the power source is a vehicle battery.

14. The brushless DC ring motor of claim 13, wherein the DC-to-DC converter is operable to selectively draw power from the vehicle battery in demanding cooling conditions.

15. The brushless DC ring motor of claim 1, wherein the stator assembly is configured in a three phase arrangement.

* * * * *

UNITED STATES PATENT AND TRADEMARK OFFICE
CERTIFICATE OF CORRECTION

PATENT NO. : 6,600,249 B2
DATED : July 29, 2003
INVENTOR(S) : Christopher A. Nelson et al.

It is certified that error appears in the above-identified patent and that said Letters Patent is hereby corrected as shown below:

Title page,
Item [56], References Cited, U.S. PATENT DOCUMENTS, "4,313,155", reference, delete "1/1982" and insert -- 1/1985 --; "5,224,446", reference, delete "7/1993" and insert -- 6/1993 --

Column 9,
Line 36, delete "Id" and insert -- If --

Signed and Sealed this

Eleventh Day of May, 2004

JON W. DUDAS
*Acting Director of the United States Patent and Trademark Office*